US010097947B2

(12) United States Patent
von Cavallar et al.

(10) Patent No.: US 10,097,947 B2
(45) Date of Patent: Oct. 9, 2018

(54) GENERATING PERSONALIZED ROUTES INCENTIVIZED FOR ONE OR MORE USERS

(71) Applicant: International Business Machines Corporation, Armonk, NY (US)

(72) Inventors: Stefan von Cavallar, Sandringham (AU); Ziyuan Wang, Malvern East (AU); Nicholas Waywood, Melbourne (AU)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/951,719

(22) Filed: Nov. 25, 2015

(65) Prior Publication Data

US 2017/0146351 A1    May 25, 2017

(51) Int. Cl.
*G06Q 50/00* (2012.01)
*G06F 17/30* (2006.01)
(Continued)

(52) U.S. Cl.
CPC ........ *H04W 4/003* (2013.01); *G01C 21/3484* (2013.01); *G06F 17/30241* (2013.01); *G06F 17/30539* (2013.01); *G06F 17/30604* (2013.01); *G06F 17/30864* (2013.01); *G06Q 50/01* (2013.01); *H04W 4/60* (2018.02); *H04L 67/10* (2013.01)

(58) Field of Classification Search
CPC ............... G01C 21/34; G06F 17/30241; G06F 17/30539; G06F 17/30604; G06F 17/30864

USPC ......................................................... 701/537
See application file for complete search history.

(56) References Cited

U.S. PATENT DOCUMENTS 9,741,021 B2 *   8/2017 Yu ....................... G06Q 10/1095
2007/0299599 A1 * 12/2007 Letchner ............ G01C 21/3484
                                                        701/424
(Continued)

OTHER PUBLICATIONS

M. Jakob et al., "Personalized Fully Multimodal Journey Planner," External Credit Assessment Institutions (ECAI), 2014, pp. 1225-1226.

(Continued)

*Primary Examiner* — Yazan A Soofi
(74) *Attorney, Agent, or Firm* — Louis J. Percello; Ryan, Mason & Lewis, LLP

(57) ABSTRACT

A method includes registering a given client device with a server to receive personalized routing for a given user, building a user model for the given user, the user model being based on personal attributes for a plurality of users including the given user, identifying patterns of personal attributes for the given user, generating a personalized route for the given user based on matching the patterns of personal attributes with one or more route attributes, identifying one or more personalized incentives for the given user based on the personal attributes of the given user and the route attributes, modifying the personalized route for the given user to generate an incentivized personalized route for the given user, and transmitting a notification from the server to the given client device over a network, wherein the notification causes the given client device to display the incentivized personalized route for the given user.

20 Claims, 7 Drawing Sheets

(51) Int. Cl.
　　　G01C 21/34　　(2006.01)
　　　H04L 29/08　　(2006.01)
　　　H04W 4/00　　(2018.01)
　　　H04W 4/60　　(2018.01)

(56) References Cited

U.S. PATENT DOCUMENTS

| | | | | |
|---|---|---|---|---|
| 2011/0320275 A1* | 12/2011 | O'Sullivan | ........ | G01C 21/3484 |
| | | | | 705/14.53 |
| 2012/0239288 A1* | 9/2012 | Forutanpour | ...... | G01C 21/3461 |
| | | | | 701/410 |
| 2012/0265433 A1* | 10/2012 | Viola | .................. | G01C 21/362 |
| | | | | 701/410 |
| 2015/0330800 A1* | 11/2015 | Huyi | .................. | G06Q 10/047 |
| | | | | 701/425 |

OTHER PUBLICATIONS

B. Yang et al., "Toward Personalized, Context-Aware Routing," The International Journal on Very Large Data Bases (VLDB), Apr. 2015, pp. 297-318, vol. 24, No. 2.

L. McGinty et al., "TURAS: a Personalized Route Planning System," Proceedings of the 6th Pacific Rim International Conference on Artificial Intelligence (PRICAI), Lecture Notes in Computer Science, 2000, pp. 791, vol. 1886.

J. Letchner et al., "Trip Router with Individualized Preferences (TRIP): Incorporating Personalization into Route Planning," Proceedings of the 18th Conference on Innovative Applications of Artificial Intelligence (IAAI), Jan. 2006, pp. 1795-1800, vol. 2.

* cited by examiner

400

GENERATING PERSONALIZED ROUTES INCENTIVIZED FOR ONE OR MORE USERS

BACKGROUND

The present invention relates to route planning, and more specifically, to generation of personalized routes. The various routines, responsibilities and habits of people can impact their lives in various ways. For example, the choice of transportation to get to work or school can impact personal fitness, mental health and expenses. Some routines, responsibilities and habits may also affect society at large. Continuing with the above example, transportation choice can affect environmental pollution, traffic congestion, city costs, etc. Some estimates peg the traffic congestion cost in the United States as $124 billion per year.

SUMMARY

Embodiments of the invention provide techniques for the generation of personalized routes that are incentivized for particular users.

For example, in one embodiment, a method comprises registering a given client device with a server to receive personalized routing for a given user, building a user model for the given user, the user model being based on personal attributes for a plurality of users including the given user, identifying patterns of personal attributes for the given user, generating a personalized route for the given user based on matching the patterns of personal attributes with one or more route attributes, identifying one or more personalized incentives for the given user based on the personal attributes of the given user and the route attributes, modifying the personalized route for the given user to generate an incentivized personalized route for the given user, and transmitting a notification from the server to the given client device over a network, wherein the notification causes the given client device to display the incentivized personalized route for the given user.

DETAILED DESCRIPTION

Illustrative embodiments of the invention may be described herein in the context of illustrative methods, systems and devices for generation of personalized routes that are incentivized for one or more users. However, it is to be understood that embodiments of the invention are not limited to the illustrative methods, systems and devices but instead are more broadly applicable to other suitable methods, systems and devices.

As discussed above, the various routines, responsibilities and habits of people, which may be collectively referred to as lifestyle, can impact not only individual persons but society at large. For instance, the various lifestyle choices with regard to transportation can have significant effects. As mentioned above, some estimates indicate that traffic congestion costs in the United States alone is $124 billion each year. Thus, it would be advantageous from a cost savings perspective to reduce traffic congestion. One possible way to reduce traffic congestion is to provide persons with options for multi-modal transportation to fill in gaps in public transportation infrastructure, thus discouraging the user of personal vehicles which contribute to traffic congestion.

User-centric approaches for multi-modal transportation systems, however, suffer from a number of disadvantages. While user-centric, integrated approaches for smart metropolitan mobility systems can provide personalized journeys or routes, such solutions typically do not provide adequate motivation to attract and retain potential users. In addition, such solutions typically do not provide functionality which encourages users to take personalized routes which may be more economical or environmentally friendly over less economical or environmentally friendly routes.

Some embodiments of the invention incorporate incentives into personalized route planning in order to motivate users to join and continue use of a system for personalized routing. The use of incentives can also provide a number of other advantages, including by way of example increasing revenue for a system for personalized routing, promoting healthier lifestyles, integrating social media information for route planning, providing businesses, governments and other entities with a channel, via the incentives, for advertising and bringing commerce into an energy and transportation domain, etc. Some embodiments integrate mobile, cognitive, social, cloud and other analytics to provide personalized routing services with incentives tailored for particular users.

Figure 1:
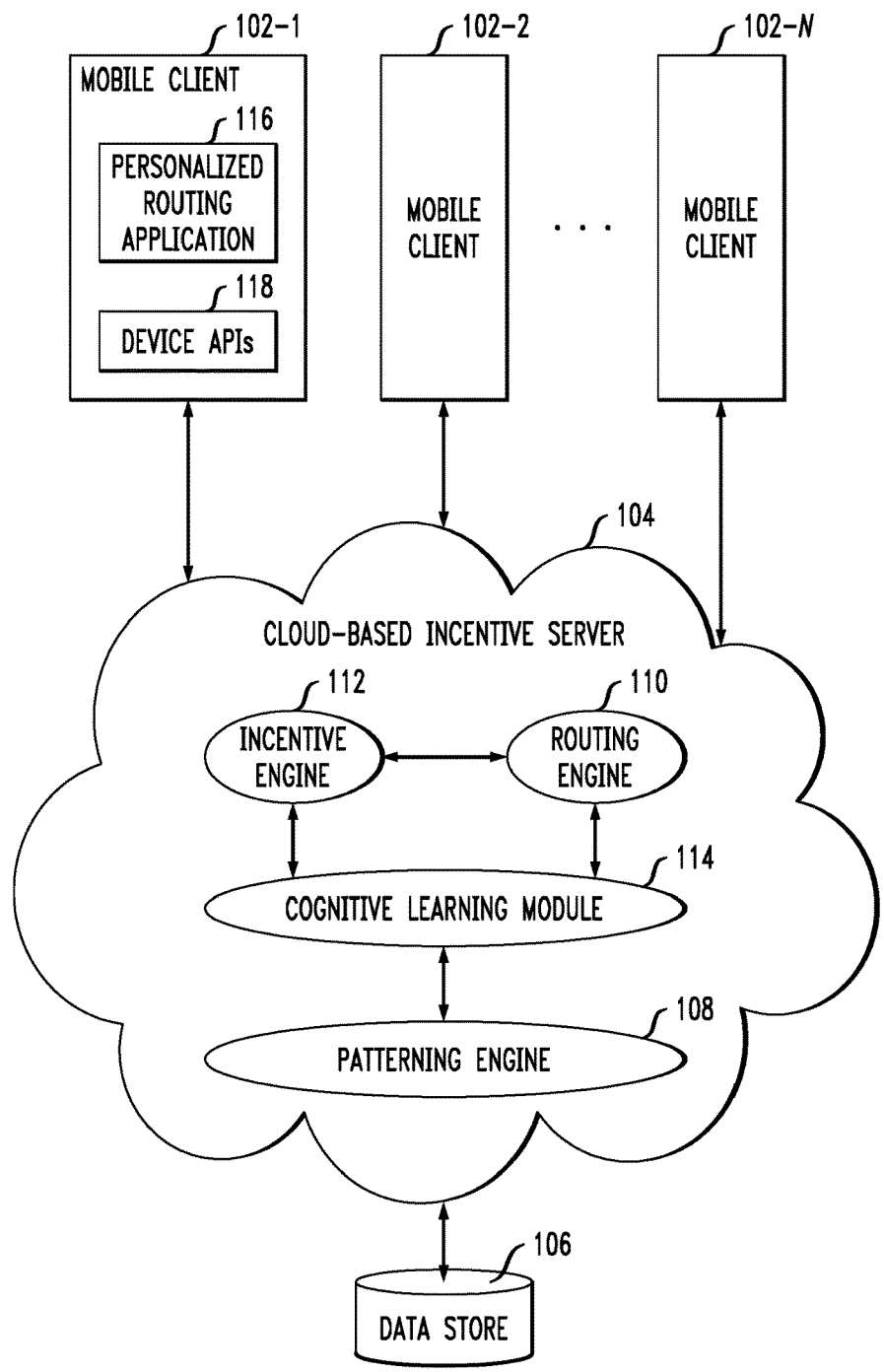
FIG. 1 depicts a system for generating personalized routes incentivized for one or more users, according to an embodiment of the present invention.

FIG. 1 shows a system 100 for generating personalized routes incentivized for one or more users. As shown, the system 100 includes a number of mobile clients 102-1, 102-2, ..., 102-N which are configured to communicate with cloud-based incentive server 104 for personalized and incentivized routing services. The cloud-based incentive server 104 collects data from various sources, shown as data store 106 in FIG. 1, for use in various analytics relating to generation of personalized routes incentivized for particular users. The cloud-based incentive server 104 may itself be a collection of multiple computing devices or servers. For example, the different engines and modules of the cloud-based incentive server 104, which will be described in detail below, may be provided by different servers or other computing devices in one or more multiple clouds. In addition, it is to be appreciated that embodiments do not require use of clouds or cloud-based servers. For example, in some embodiments that various engines and modules of the cloud-based incentive server 104 may be implemented in a server which is not cloud-based.

Data store 106 may be, by way of example, a social data source such as one or more social media platforms. The data store 106 may additionally or alternatively be a database or other repository of business incentives, social incentives, manual input and user history, information derived or otherwise obtained from social media, etc. Although FIG. 1 shows only a single data store 106, embodiments are not so limited. In other embodiments, the cloud-based incentive server 104 may collect and exchange data with multiple distinct data stores or other data sources.

Cloud-based incentive server 104 collates the information from data store 106 to build user models for particular users or groups of users and to identify user preferences or patterns for generating personalized routes or journeys as well as incentives for such personalized routes. For example, collated preferences may be used to identify patterns in a user's travel activities and social profile to create personalized route suggestions in the patterning engine 108. As will be discussed in further detail below, the personalized route for a given user may be based not only on information specific to the given user but also from information of similar users or friends or other users associated with the given user. In addition, a personalized route or portion thereof may be generated for a group of users collectively or on a per-user basis. Pattern identification and user profiling and modeling may be achieved through cognitive learning algorithms as will be discussed in further detail below.

In some embodiments, the incentives are not directly related to a personalized route. The incentives may be decoupled from the personalized route in that the incentives are offered based on factors that are not necessarily dependent on the route. As an example, cloud-based incentive server 104 can offer an incentive in the form of a given user receiving a free or discounted pizza meal because it has analyzed the given user's social network and learned that the given user loves pizza. This incentive, however, may be offered purely or primarily to persuade the given user to take an alternative travel route that would achieve an unrelated goal such as minimizing congestion or providing a route that is more aesthetically pleasing for the given user.

As shown in FIG. 1, mobile clients 102 are configured for communication with the cloud-based incentive server 104 over one or more wireless networks for personalized routing and incentive services. Mobile clients 102 may be cellular phones, tablets, smartwatches, etc. making the system for personalized routing and incentive services easily accessible regardless of a location of a user. Embodiments, however, are not limited solely to arrangements in which mobile clients communicate with cloud-based servers. Instead, other embodiments may include other types of clients, such as desktop clients, also configured for communication with the cloud-based servers over one or more wired and/or wireless networks. For example, in some embodiments a user may register to receive personalized and incentivized routing services via a desktop client, but choose to receive notifications regarding incentivized personalized routes at one or more mobile clients which the user has access to.

Mobile clients 102 communicate with routing engine 110 of the cloud-based incentive server 104 in order to receive personalized and incentivized routes for users of the mobile clients 102. FIG. 1, for example, shows mobile client 102-1 having a personalized routing application 116 and device application programming interfaces (APIs) 118 to facilitate communication with the cloud-based incentive server 104. Although not specifically shown in FIG. 1, one or more other ones of the mobile clients 102 may also include personalized routing applications and/or device APIs for facilitating communication with the cloud-based incentive server 104.

The routing engine 110 can utilize pattern information from the patterning engine 108 as well as incentives from the incentive engine 112 in order to generate an incentivized personalized route for a given user. Each of the patterning engine 108, routing engine 110 and incentive engine 112 may exchange information with one another and utilize cognitive learning module 114 in generating the personalized incentivized route. For example, incentives may be matched to personalized routes through the use of cognitive learning algorithms implemented in the cognitive learning module 114, which itself may utilize social data and user models constructed in the patterning engine 108. As an example, incentives may be matched for promotion of users' activities and achievements through gamification and social networks.

Various businesses, governments and other entities or enterprises may utilize incentives to achieve various goals. The incentive engine 112 may, in some embodiments, utilize business incentives. Businesses may be motivated to offer incentives through the incentive engine 112 for a variety of reasons. For example, incentives having a monetary value may be considered valuable by users, while businesses in exchange may receive increased brand reputation or recognition. Businesses can also use incentives to attract and target new customers, as well as retain existing customers, in an efficient manner. Businesses may also offer incentives to increase their brand recognition and/or reputation, as well as to generate revenue streams.

As will be described in further detail below, incentives may be organized into a hierarchy, repository, database or other data store such as data store 106 for use by the incentive engine 112 of the cloud-based incentive server 104. More generally, the system 100 contains or has access to a collection of incentives, which may comprises products, services, etc. submitted by participating incentive sources such as businesses, governments, clubs, groups or other entities or enterprises. Cognitive learning module 114 utilizes cognitive learning algorithms to match incentives to appropriate users based on user models whose construction and representation is the result of analyzing components such as user preferences, social media information, travel history, etc. Incentive engine 112 may thus be tightly coupled to other components of the cloud-based incentive server 104, including the routing engine 110, such that incentives are directly integrated into personalized routes for users.

The incentive engine 112 may offer incentives based on user interests, likes or other preferences using a gamification strategy. For example, users may be rewarded for accepting and following incentivized personalized routes to earn greater incentives or to unlock incentives in successive levels of a defined hierarchy. Incentive engine 112 can integrate incentives with personalized routes by tailoring the routes based on user interests or likes to direct users to areas where incentives may be claimed. As will be described in further detail below, various contextual parameters may be utilized by the incentive engine 112 in deciding which incentives to integrate into particular personalized routes. Incentives, and personalized routes generally, may also be generated by the cloud-based incentive server 104 based on journeys or routes of friends or other users associated with a given user such that portions of the personalized routes for two different users that are friends or otherwise connected will overlap with one another for at least a portion of the respective routes.

The following scenario outlines an example use case for a business incentive. Dave owns a coffee house located in the proximity of Mary's route to and from work. Dave wants to promote his coffee as well as increase the visibility of his business. As such, Dave registers with the cloud-based incentive server 104 as an incentive source, offering a promotion for his coffee house. Mary, who has previously registered with the cloud-based incentive server 104 to received personalized routing via one or more devices such as Mary's smartphone, receives a notification from the cloud-based incentive server 104 about Dave's promotion before setting off on her regular route to work. The notification, as an example, may cause display of Mary's normal route as well as a modified route to follow in order to collect the incentive, Dave's coffee house promotion. In some embodiments, the notification may display only the modified route rather than both the normal and modified route. In addition, in other embodiments an entire route need not be shown and instead the notification may only provide information regarding the detour, relative to the normal route, for collecting the incentive. In some embodiments, the notification may cause a pop-up display or other device notification indicating the availability, for viewing and/or download, of incentives or incentivized personalized routes.

On receiving the notification, Mary may be given the option of accepting or rejecting the modified and incentivized personalized route. If Mary accepts the invite, Dave benefits by gaining a new customer as well as by increased recognition or reputation if Mary promotes Dave's coffee shop through her social network. This promotion may be a feature provided by cloud-based incentive server 104 in conjunction with device APIs and/or a personalized routing application on Mary's device. For example, after accepting an incentivized personalized route the personalized routing application on Mary's device may seek feedback or other input relating to the incentive to publish to one or more social media accounts, online ratings systems, or other feedback which may be fed back to cloud-based incentive server 104.

Social incentives are a useful feature provided by the incentive engine 112. Social incentives can be important as social interactions, such as sharing on social media, liking, reviews and other feedback. Competition or collaboration with friends or other related users can be pivotal for customer retention and attracting new users. System 100, via cloud-based incentive server 104, can leverage social media as a source of input for building personalized user models, routes and incentives. For example, in the scenario above, cloud-based incentive server 104 may select Mary as a candidate for Dave's promotion by analyzing Mary's social network to determine that she likes coffee. Incentive engine 112, for example, may traverse graphs of Mary's social networks such as Facebook® to map Mary's and her friends' liked or visited places, joined groups, etc. Such information may be utilized to identify personal attributes, patterns of user behavior, route attributes and incentives. For example, such information may be used to find incentives from incentives sources with a degree of similarity to one or more of Mary's interests, preferences, preferred locations, etc. As a specific example, Mary may be targeted for Dave's promotion because Mary and one or more of her friends are members of a coffee lover's group. The coffee lover's group may be a common node in a social network graph used to match Mary with Dave's coffee shop promotion. Various other examples are possible for matching users with incentives tailored to those users' interests, preferences, preferred locations, etc. The incentive engine 112 may also take into account information such as location reported by Mary's mobile client, frequency analysis in travel history or of social media actions, text analytics of reviews or comments, etc.

Mary's social network can also be utilized to identify other potential targets for Dave's promotion or other incentives. The system 100 thus allows businesses or other entities to participate in influencing incentives, as well as utilizing user behavior to suggest new incentives to be offered by businesses or other entities.

Figure 2:
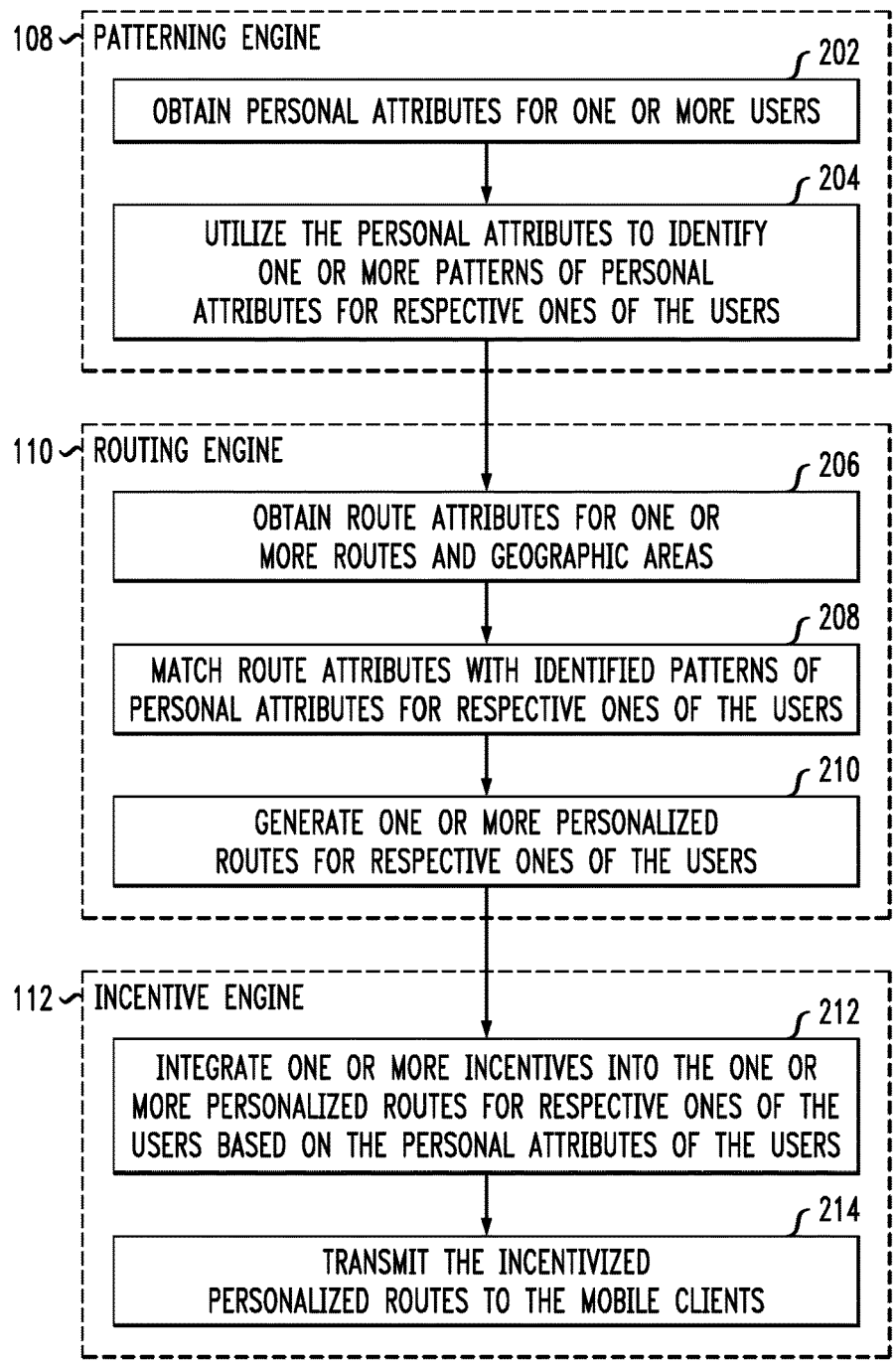
FIG. 2 depicts an example of processing performed in the cloud-based incentive server of the FIG. 1 system, according to an embodiment of the present invention.

FIG. 2 shows an example of processing operations which may be performed by the patterning engine 108, routing engine 110 and incentive engine 112. Patterning engine 108 obtains personal attributes for one or more users in block 202. The personal attributes for a given user may take various forms. For example, personal attributes may include transportation preferences such as preferring biking over walking, the use of buses over subways or trains, etc. Personal attributes may also include various lifestyle attributes, such as desired levels of physical activity or food choices. A particular one of the mobile clients 102 for a given user, by way of example, may include one or more fitness tracking features or applications. The given user may set a target goal such as a number of steps to take each day, total distance traveled, calories burned, times of elevated heart rate, etc.

Various personal attributes, such as food choices, may be specified by a given user or may be learned through past behavior. The cognitive learning module 114, for example, may take input from data store 106 such as social media postings and other information to learn the likes and dislikes of a given user for certain types of food. Cognitive learning module 114 may take input from data store 106 in learning various other personal attributes for a given user, such as the above-mentioned transportation preferences or preferences relating to preferred people, places and locations. For example, the cognitive learning module 114 may utilize social media postings or other social data, purchase histories, etc. to identify preferred businesses or types of products.

Patterning engine 108 utilizes the personal attributes to identify one or more patterns of personal attributes for respective ones of a plurality of users in block 204. Various types of patterns may be learned using cognitive learning algorithms implemented in the cognitive learning module 114. A given user may be clustered with one or more other users having similar personal attributes. Using such clusters, patterns may be identified. For example, a cluster of users that prefer a healthy lifestyle and biking as a mode of transportation may also like to drink kale shakes. Patterns may also be identified by mining social data of friends or acquaintance of a given user in addition to or as an alternative to the above-noted clustering approach.

In some embodiments, the processing in blocks 202 and 204 implemented by the patterning engine 108 may involve building a user model by mining social networks of a given user. Building the user model may include creating a graph network of actions of the given user and other ones of a plurality of users based on data obtained from mining the social networks of the given user. To identify patterns of personal attributes, the graph network may be traversed utilizing various graph algorithms. As an example, graph query languages such as Cypher or Gremlin may be used. The graph network may use the Resource Description Framework (RDF) format and utilize an RDF query language such as SPARQL or another semantic query language. It is to be appreciated that the above query languages are presented by way of example, and that embodiments are not limited solely to use with the particular graph types, formats and query languages listed above. Instead, various other graph types, formats and query languages may be utilized in other embodiments.

Various types of search algorithms may be used for identifying patterns based on the graph network. As an example, a breadth-first search (BFS) algorithm may be used to implement the following example query:

```
MATCH (UserA) -> (UserB) - [LIKES] -> (UserB.Achievement)
WHERE UserA.username EQUALS currentUser
RETURN UserB.Achievement
```

Various other search algorithms may be used, such as but not limited to depth-first search (DFS) algorithms.

Graph queries may also be utilized to learn or obtain the personal attributes for a given user. A sample query is presented below for obtaining a preferred transportation mode for a given user:

```
MATCH (UserA) -> (Transport)
WHERE UserA.username EQUALS currentUser
WITH COUNT(Transport.mode) AS numUsedTransportMode
RETURN MAX(numUsedTransportMode)
```

The above query may be modified to learn other preferred personal attributes for the given user, or to learn route attributes as will be discussed below.

The routing engine 110 in block 206 obtains route attributes for one or more routes and/or geographic areas. For example, the routing engine 110 may receive input, either direct input from a user via one of the mobile clients 102 or through learning via travel history in data store 106, regarding the sources and destinations for routes taken by different users. The sources and destinations may be used to define a geographic area to limit the search for route options as well as to obtain relevant traffic, weather and other information that may affect generation of personalized routing.

Route attributes, similar to the above-described personal attributes, are varied. Route attributes may include, by way of example, bike paths, walking paths, public transportation lines or paths, roads, etc. Route attributes may also include information such as points of interest locations along paths between sources and destinations. The route attributes may be obtained from a database or other repository in data store 106, or may be learned by mining social networks and other sources utilizing cognitive learning module 114.

Route attributes may be affected by other information such as relevant traffic or weather data. For example, weather data may be obtained for a geographic area covering paths between a source and a destination, or for particular locations between the source and the destination. Route attributes may be adjusted based on weather data. For example, if it is raining or snowing, bike or walking paths may be indicated as unavailable or subject to constraints. Similarly, live traffic data may be obtained for a geographic area covering paths between the source and the destination, or for particular locations between the source and the destination. Route attributes may also be adjusted based on the live traffic data. For example if a particular subway line, bus route, walking path, bike path, road, etc. is under construction or subject to delays, this may affect the route attributes which are used in generating personalized routes as well as the incentives offered as will be described in further detail below.

In block 208, the routing engine 110 matches route attributes with identified patterns of personal attributes for respective users. This matching may be done so as to optimize preferences of a given user. For example, if the personal attributes indicate that the given user's preferred mode of transportation is by bike, the routing engine 110 may match route attributes which complement biking as the mode of transportation. Graph networks and graph queries may be utilized for matching route attributes with the identified patterns of personal attributes. A sample query is presented below for obtaining a route with attributes complementing a preferred mode of transport for a given user:

```
MATCH ARRAY(RouteSegment) as Route, (UserA)
WHERE RouteSegment.transportMode EQUALS
UserA.transportModePreference
AND RouteSegment.startLocation WITHIN RANGE(<lat>,<lon>,
  <radius>)
AND RouteSegment.endLocation WITHIN RANGE(<lat2>,<lon2>,
  <radius2>)
RETURN Route
```

The above query may be modified to obtain a route based on various other attributes for the given user.

In block 210, the routing engine 110 generates one or more personalized routes for respective users. The incentive engine 112 integrates one or more incentives into the one or more personalized routes for respective ones of the users based on the personal attributes of the users. Integrating incentives into the personalized routes may include mapping social media activity of a given user, and possibly other users associated with the given user, to determine a set of preferred products, places, locations, etc. The incentives for the given user may then be selected from a database of incentives, where the selected incentives are linked in some way to the set of preferred products, places, locations, etc. as well as other personal attributes and route attributes. In this manner, incentives may be used to encourage a user to utilize an incentivized route over another route by aligning incentives with known user preferences, personal attributes, or route attributes. Several examples of incentives are provided below. It is to be appreciated, however, that embodiments are not limited solely to use with the specific incentive examples given below. Instead, various other incentives may be used in embodiments, including combinations of and modifications of the specific examples presented below:

Consider a user whose preferences indicate that they enjoy coffee. An incentive linked to this preference may be a coupon, deal or reward for visiting a coffee shop between a source and destination of a personalized route. To integrate this incentive, the personalized route is modified such that it passes by the location of the coffee shop.

Consider a user whose preferences indicate a healthy lifestyle. An incentive linked to this preference may be to visit a farmer's market or other healthy eating establishment. Again, the personalized route may be modified such that it passes by the location of the farmer's market or other healthy eating establishment to integrate this incentive.

Consider a user whose preferences indicate that walking is a preferred mode of transportation. An incentive linked to this preference may be a business that is located along a walking path which would not normally be part of the route between the source and the destination. The personalized route may be modified to use the walking path based on some type of coupon, deal, reward or other incentive associated with the business that is along the walking path.

Consider a user whose social media activity indicates that various friends or other acquaintances are part of a particular gym, club or group. Incentives linked to such sources may include coupons, deals, rewards or other incentives for visiting the gym, club or group. The personalized route may be modified to integrate such incentives to pass by or stop at the gym, club or group.

Consider a system having a goal of reducing traffic congestion. Incentives linked to this goal may include designing a route that utilizes only public transportation rather than personal vehicles. To encourage the use of such a route, incentives may be used such as discounted prices on the public transportation, coupons or rewards for businesses near public transportation stops, etc.

Consider a first user having a first personalized route between a source and destination with a portion thereof that intersects with or is close to a portion of a second personalized route for a second user. If the first and second user are friends or otherwise connected on social media or by similar profiles and interests, the incentive may be to meet at a location which is close to or on one or both of the first and second personalized routes so that the first and second users can meet one another. The incentive may include a coupon, deal, reward or other incentive for visiting a business at the location close to or on one or both of the first and second personalized routes. In some embodiments, the incentive may be competitive between the first and second user. For example, the incentive may indicate a coupon or reward that will be given to the first of a group of users to reach a particular destination. Continuing the above scenario, the reward or coupon may be given to either the first user or the second user based on which of these users reaches the location of the incentive first.

As discussed above, the incentives may be selected from a database or repository of incentives. Businesses or other entities may register as incentive sources with the cloud-based incentive server 104 so as to add possible incentives to the database of incentives. Businesses or other entities, however, need not necessarily add possible incentives to a database. Instead, a business or other entity may register as an incentive source so that the cloud-based incentive server 104, via the incentive engine 112, may suggest incentives for use in generating incentivized personalized routes for a plurality of users.

In some embodiments, the incentives in the incentive database may be organized into a hierarchy of multiple incentive levels. Different users that have registered with the cloud-based incentive server 104 may be assigned different incentive levels. The personalized incentives selected for such users may be determined by matching the incentive level of the user to an incentive level in the hierarchy. Users may be assigned to different incentive levels based on rewards earned for past activity. As an example, a given user may earn rewards by utilizing incentivized personalized routes provided by the cloud-based incentive server 104. In some embodiments, the incentives offered by respective incentive source may be organized into different hierarchies of incentive levels. In other embodiments, the incentives offered by the incentive sources may be organized collectively rather than individually.

The incentive engine 112 may, in some embodiments, utilize contextual information for selecting the incentives to utilize for a particular personalized route. Contextual parameters may include, by way of example, time of day, travel purpose, the destination of the personalized route, etc. If the time of day for a given personalized route does not match with the business hours of a particular incentive source, incentives offered by that incentive source would not be selected for the given personalized route. Alternatively, if the time of day for the given personalized route coincides with on or off-peak hours of an incentive source, the amount of the incentive may be adjusted accordingly. For example, if a restaurant has certain busy times, the amount of a coupon offered as an incentive during such busy times may be relatively low in comparison to the amount of the coupon offered as an incentive during slow times.

Travel purpose or the destination of the personalized route may also affect the incentives offered. For example, if the destination of a particular personalized route is a restaurant, incentives may not be selected for incentive sources that are also restaurants or eateries. If the travel purpose is a road trip to, for example, a beach, incentive sources may be selected which offer to-go food or beverages which may be brought to the beach.

Incentive engine 112, in block 214, transmits the incentivized personalized routes to the mobile clients 102. Transmitting the incentivized personalized route to a given mobile client such as mobile client 102-1 may, in some embodiments, include transmitting a notification to the mobile client 102-1. The notification may be transmitted over one or more wireless networks to mobile client 102-1, and utilize device APIs 118 of the mobile client 102-1 to initiate one or more functions of personalized routing application 116. For example, transmission of the notification may cause the mobile client to display some sort of indication that a new incentivized personalized route is available and provide a selectable link or other user interface feature permitting the user to initiate download of the incentivized personalized route from the cloud-based incentive server 104 to mobile client 102-1. As another example, the notification itself may also include the incentivized personalized route such that selection of the link or other user interface feature causes display of the incentivized personalized route on the mobile client 102-1.

In some embodiments, the personalized routing application 116 provides user interface functions permitting a user of the mobile device 102-1 to register with the cloud-based incentive server 104 to receive incentivized personalized routes, or to request a particular personalized route between a source and a destination. Device APIs on the mobile client 102-1 may be used to select a current location of the mobile client 102-1 as the source of such a request, utilizing location sensors such as Global Positioning System (GPS) sensors of the mobile client 102-1. Cellular or other wireless networking information may also or alternatively be utilized by the device APIs to determine a current location of the mobile client 102-1 to utilize as the source for the personalized route. In other embodiments, the user interface features of the personalized routing application 116 permit the user to specify the source as well as the destination for a requested personalized route.

User interface features of the personalized routing application 116 may also allow a user of the mobile client 102-1 to specify preferred categories of incentives, to request information about how the incentives affect a particular personalized route, to provide feedback on the incentives provided in one or more incentivized personalized routes, etc. Such information may be fed back to the cloud-based incentive server 104 over one or more wireless networks, possibly utilizing device APIs 118.

Information about how incentives affect particular routes may include, by way of example, indications of the time or distance added to a particular route by incentives. For example, if an incentive for a personalized route causes the use of a particular path which is ¼ mile longer, this may be displayed to the user via the personalized routing application, either as a distance measure, an expected time to travel (e.g., 5 extra minutes), or both. Feedback information may be explicit, such as the user giving a numerical or other type of rating (star rating, like/dislike) to particular incentives. Feedback information may also be gathered based on a user accepting or rejecting, or using or not using, a particular incentivized personalized route without requiring the user to explicitly rate particular incentives. Cloud-based incentive server 104 can utilize such information in machine learning algorithms implemented by the cognitive learning module 114 so as to improve the generation of personalized routes as well as the selection of incentives to integrate in personalized routes.

Figure 3:
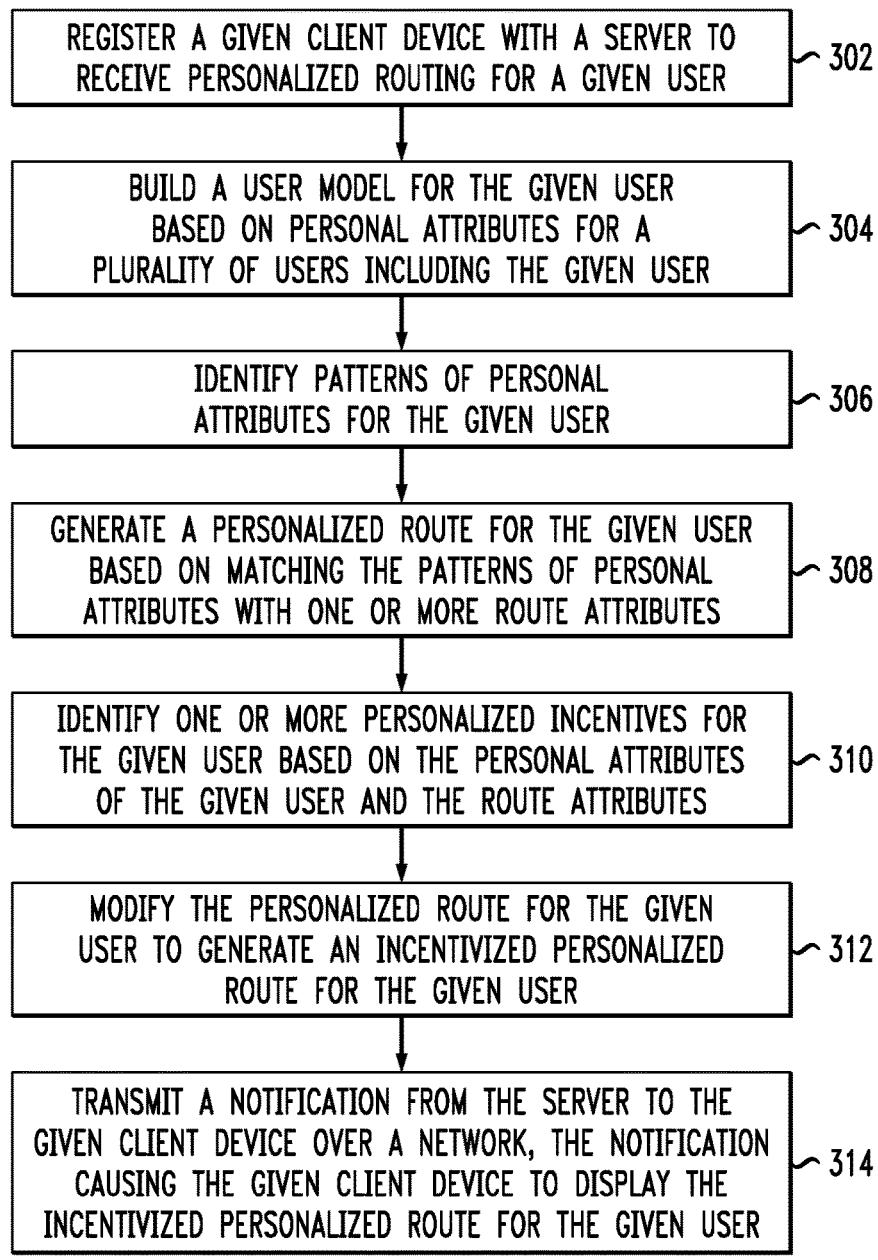
FIG. 3 depicts a process for generating personalized routes incentivized for one or more users, according to an embodiment of the present invention.

FIG. 3 depicts a process 300 for generating personalized routes incentivized for one or more users. The process 300 may be implemented by cloud-based incentive server 104 and one or more of the mobile clients 102, or by other processing and computing devices which may or may not be cloud-based.

Process 300 begins with registering a given client device with a server to receive personalized routing for a given user in step 302. The given client device may be one of the mobile clients 102 shown in the FIG. 1 system, and the server may be cloud-based incentive server 104. Registration of a given client device may be done in response to a request from the user, which may be sent to the cloud-based incentive server 104 via one or more of the mobile clients 102 or by another computing device. As an example, a given user may register their cellular phone as a client device to receive incentivized personalized routes. This registration, performed at cloud-based incentive server 104, may be in response to a request received from the cellular phone or from a desktop computer, laptop computer, tablet or other computing device configured for communication over a network with the cloud-based incentive server 104. Registration of the given client device in step 302 may include registering multiple devices associated with the given user to receive personalized routing. For example, a user may register both a tablet and a cellular phone to receive personalized routing from the cloud-based incentive server 104.

In registering the given client device in step 302, numerous options and features may be selected. For example, a given user may specify as part of the registration a set of travel plans, such as the work schedule of the given user and the home and work locations for the given user. The registration may also permit the cloud-based incentive server 104, via communication with the given client device, to access a calendar of the given user so as to learn when personalized routes are needed. Alternatively or additionally, the given user may, via a personalized routing application running on one of the mobile clients, send subsequent requests for personalized routes.

Other options that may be selected during registration may be access to accounts or other information about the given user. For example, the given user may choose to share with the cloud-based incentive server 104 access to social media posts and activities, friends or other contact lists, location history, past emails or other messages, etc. to be used in generating the personalized routes and to select incentives for integration into the personalized routes. In this sense, the given client device such as one of the mobile clients 102 may itself be considered as part of the data store 106.

Figure 4:
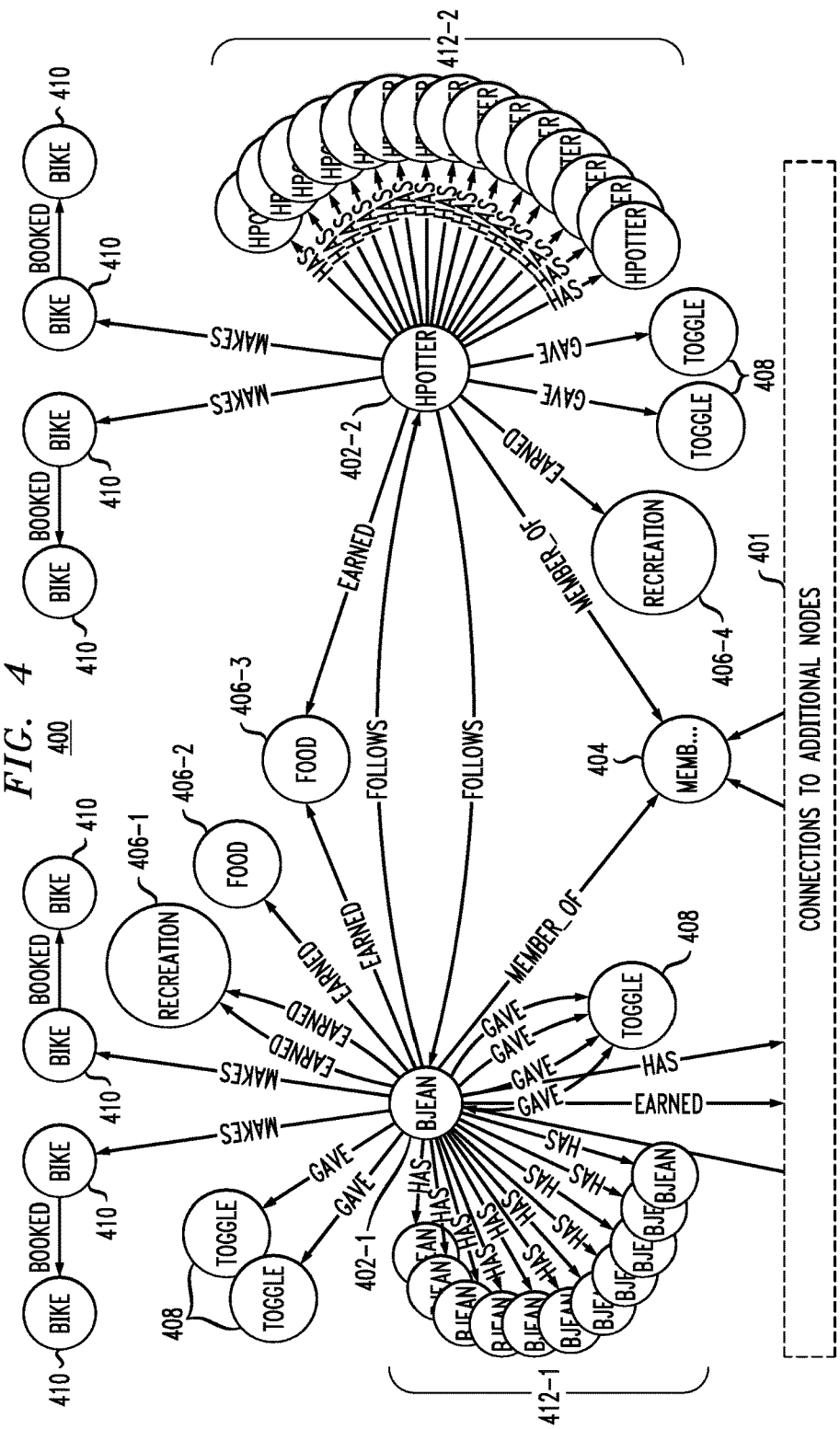
FIG. 4 depicts an example graph representation of user data utilized for generating personalized routes incentivized for one or more users, according to an embodiment of the invention.

In step 304, a user model is built for the given user based on personal attributes for a plurality of users including the given user. As discussed above, a user model may be built based on data sources specific to the given user as well as data sources for friends or contacts of the given user, or for other users determined to be similar to the given user. The user model may be built as a graph network. FIG. 4, which will be discussed in detail below, shows an example of such a graph network user model. It is to be appreciated, however, that the user model is not limited solely to being a graph network or graph representation. Instead, various other types of models may be used, including but not limited to Document, Column and Key-Value NoSQL databases, SQL databases, etc.

The process 300 continues with identifying patterns of personal attributes for the given user in step 306 and generating a personalized route for the given user based on matching the patterns of personal attributes with one or more route attributes in step 308. As discussed above, patterns may be identified by querying a graph network or by otherwise utilizing a user model built for the given user. Various types of machine learning algorithms may be utilized, including supervised, unsupervised and semi-supervised learning algorithms utilizing techniques such as neural networks, cluster analysis, belief networks, support vector machines, random forests, decision trees, Bayesian networks, Hidden Markov models, etc. The particular algorithm or algorithms used may be fine-tined by a domain expert for specific domain problems and attributes.

In step 310, personalized incentives for the given user are identified based on the personal attributes of the given user and the route attributes. As discussed above, the identification of personalized incentives may be based on contextual parameters in some embodiments. Also as discussed above, the particular types or levels of incentives identified or selected for the given user may be based on matching incentive levels of the user to a hierarchy of incentives.

The personalized route generated in step 308 is modified to generate an incentivized personalized route for the given user in step 312. This modification may include adding stops on the path of the personalized route, detouring the personalized route so as to pass by a particular business or other entity that provide the incentives integrated into the personalized route, etc. The process 300 then continues with transmitting a notification from the server to the given client device over a network in step 314, where the notification causes the given client device to display the incentivized personalized route for the given user. As discussed above, this may be achieved by displaying an alert or notification on the given client device which indicates that a new personalized route is available for viewing or for download, a prompt to launch a personalized routing application, etc.

FIG. 4 shows an example graph representation 400 of user data, which may be utilized for generating personalized routes incentivized for one or more users. The graph representation 400 is an example of just a portion of user data for clarity. As indicated in element 401, the various nodes shown may connect with other nodes in a larger graph network. The graph representation 400 shows two user account nodes, for user bjean 402-1 and user hpotter 402-2. The user account nodes connect to other nodes via various actions such as has, makes, gave, earned, follows and booked. The user account nodes 402-1 and 402-2, for example, "follow" one another and are a members of user role node 404. Graph representation further shows a number of achievement nodes 406, such as recreation and food achievements, a number of feedback nodes 408, a number of booking nodes 410, and a number of tracking nodes 412.

As users follow one another and their interests, provide feedback on experiences, submit travel activities, etc. the graph representation may be expanded to include additional instances of the above described nodes as well as other nodes not specifically shown in FIG. 4. Machine learning and analytics may be used to traverse the graph network using a variety of graph algorithms as discussed above. Cognitive learning module 114 may utilize graph data such as graph representation 400 in building user models, identifying personal attributes, route attributes, patterns of personal attributes or route attributes, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 5:
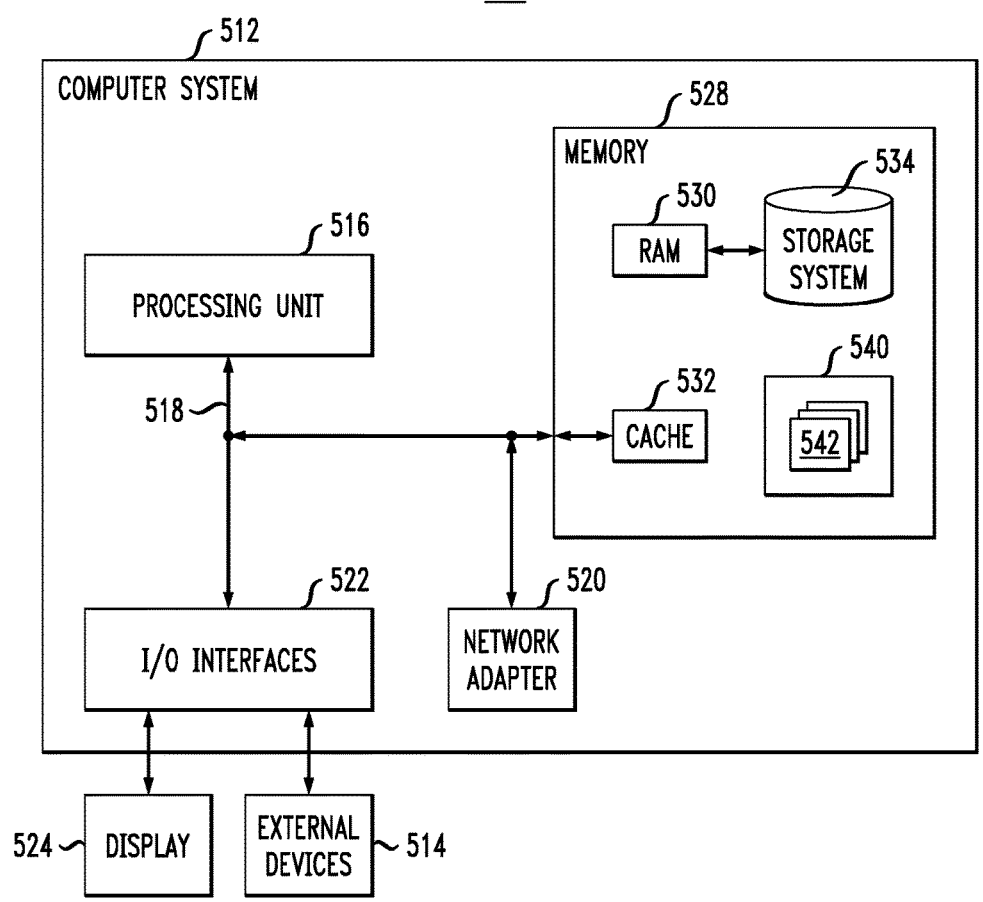
FIG. 5 depicts a computer system in accordance with which one or more components/steps of techniques of the invention may be implemented, according to an embodiment of the invention.

One or more embodiments can make use of software running on a general-purpose computer or workstation. With reference to FIG. 5, in a computing node 510 there is a computer system/server 512, which is operational with numerous other general purpose or special purpose computing system environments or configurations. Examples of well-known computing systems, environments, and/or configurations that may be suitable for use with computer system/server 512 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 512 may be described in the general context of computer system executable instructions, such as program modules, being executed by a computer system. Generally, program modules may include routines, programs, objects, components, logic, data structures, and so on that perform particular tasks or implement particular abstract data types. Computer system/server 512 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 512 in computing node 510 is shown in the form of a general-purpose computing device. The components of computer system/server 512 may include, but are not limited to, one or more processors or processing units 516, a system memory 528, and a bus 518 that couples various system components including system memory 528 to processor 516.

The bus 518 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

The computer system/server 512 typically includes a variety of computer system readable media. Such media may be any available media that is accessible by computer system/server 512, and it includes both volatile and non-volatile media, removable and non-removable media.

The system memory 528 can include computer system readable media in the form of volatile memory, such as random access memory (RAM) 530 and/or cache memory 532. The computer system/server 512 may further include other removable/non-removable, volatile/nonvolatile computer system storage media. By way of example only, storage system 534 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 518 by one or more data media interfaces. As depicted and described herein, the memory 528 may include at least one program product having a set (e.g., at least one) of program modules that are configured to carry out the functions of embodiments of the invention. A program/utility 540, having a set (at least one) of program modules 542, may be stored in memory 528 by way of example, and not limitation, as well as an operating system, one or more application programs, other program modules, and program data. Each of the operating system, one or more application programs, other program modules, and program data or some combination thereof, may include an implementation of a networking environment. Program modules 542 generally carry out the functions and/or methodologies of embodiments of the invention as described herein.

Computer system/server 512 may also communicate with one or more external devices 514 such as a keyboard, a pointing device, a display 524, etc., one or more devices that enable a user to interact with computer system/server 512, and/or any devices (e.g., network card, modem, etc.) that enable computer system/server 512 to communicate with one or more other computing devices. Such communication can occur via I/O interfaces 522. Still yet, computer system/server 512 can communicate with one or more networks such as a LAN, a general WAN, and/or a public network (e.g., the Internet) via network adapter 520. As depicted, network adapter 520 communicates with the other components of computer system/server 512 via bus 518. It should be understood that although not shown, other hardware and/or software components could be used in conjunction with computer system/server 512. Examples include, but are not limited to, microcode, device drivers, redundant processing units, external disk drive arrays, RAID systems, tape drives, and data archival storage systems, etc.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
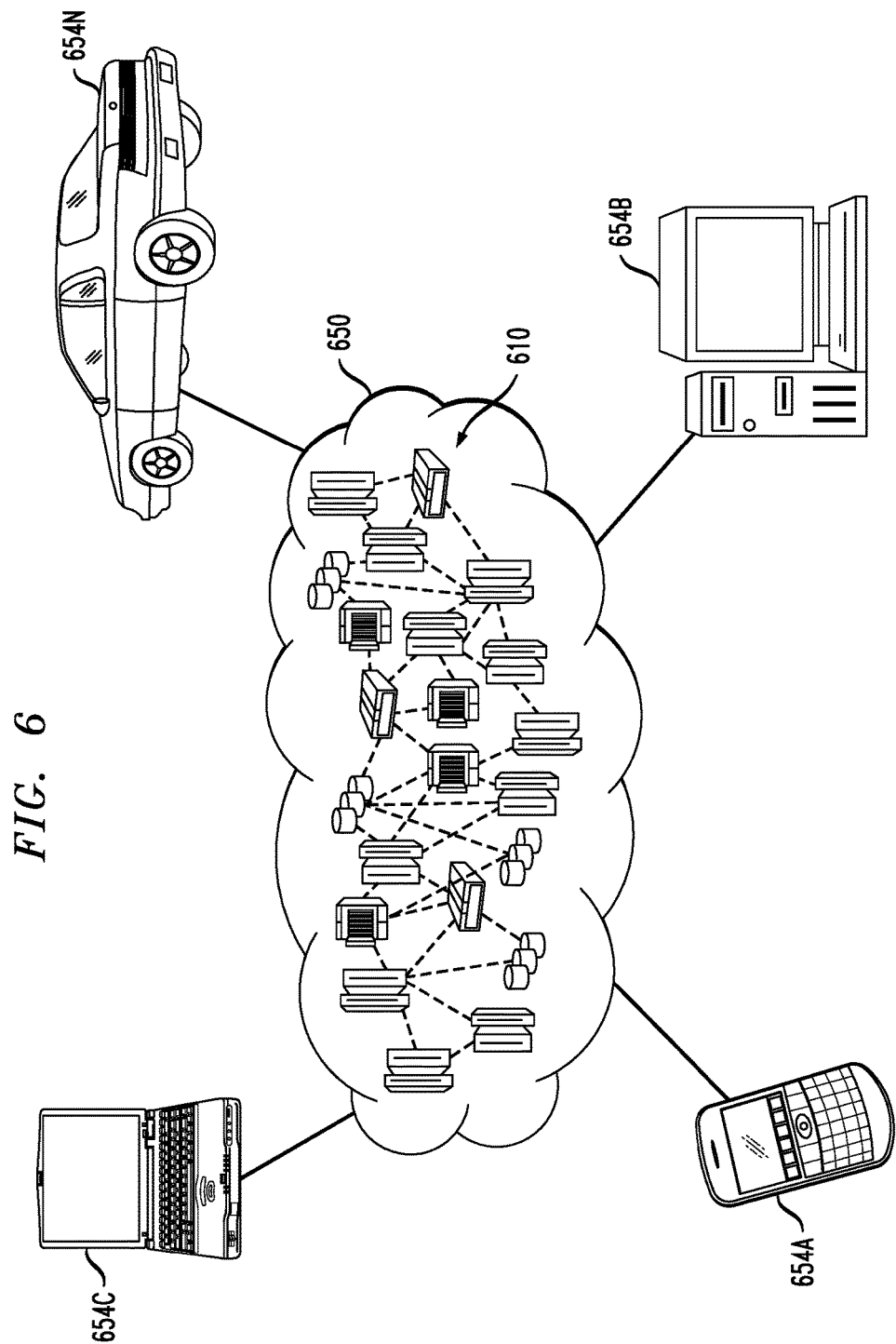
FIG. 6 depicts a cloud computing environment, according to an embodiment of the present invention.

Referring now to FIG. 6, illustrative cloud computing environment 650 is depicted. As shown, cloud computing environment 650 comprises one or more cloud computing nodes 610 with which local computing devices used by cloud consumers, such as, for example, personal digital assistant (PDA) or cellular telephone 654A, desktop computer 654B, laptop computer 654C, and/or automobile computer system 654N may communicate. Nodes 610 may communicate with one another. They may be grouped (not shown) physically or virtually, in one or more networks, such as Private, Community, Public, or Hybrid clouds as described hereinabove, or a combination thereof. This allows cloud computing environment 650 to offer infrastructure, platforms and/or software as services for which a cloud consumer does not need to maintain resources on a local computing device. It is understood that the types of computing devices 654A-N shown in FIG. 6 are intended to be illustrative only and that computing nodes 610 and cloud computing environment 650 can communicate with any type of computerized device over any type of network and/or network addressable connection (e.g., using a web browser).

Figure 7:
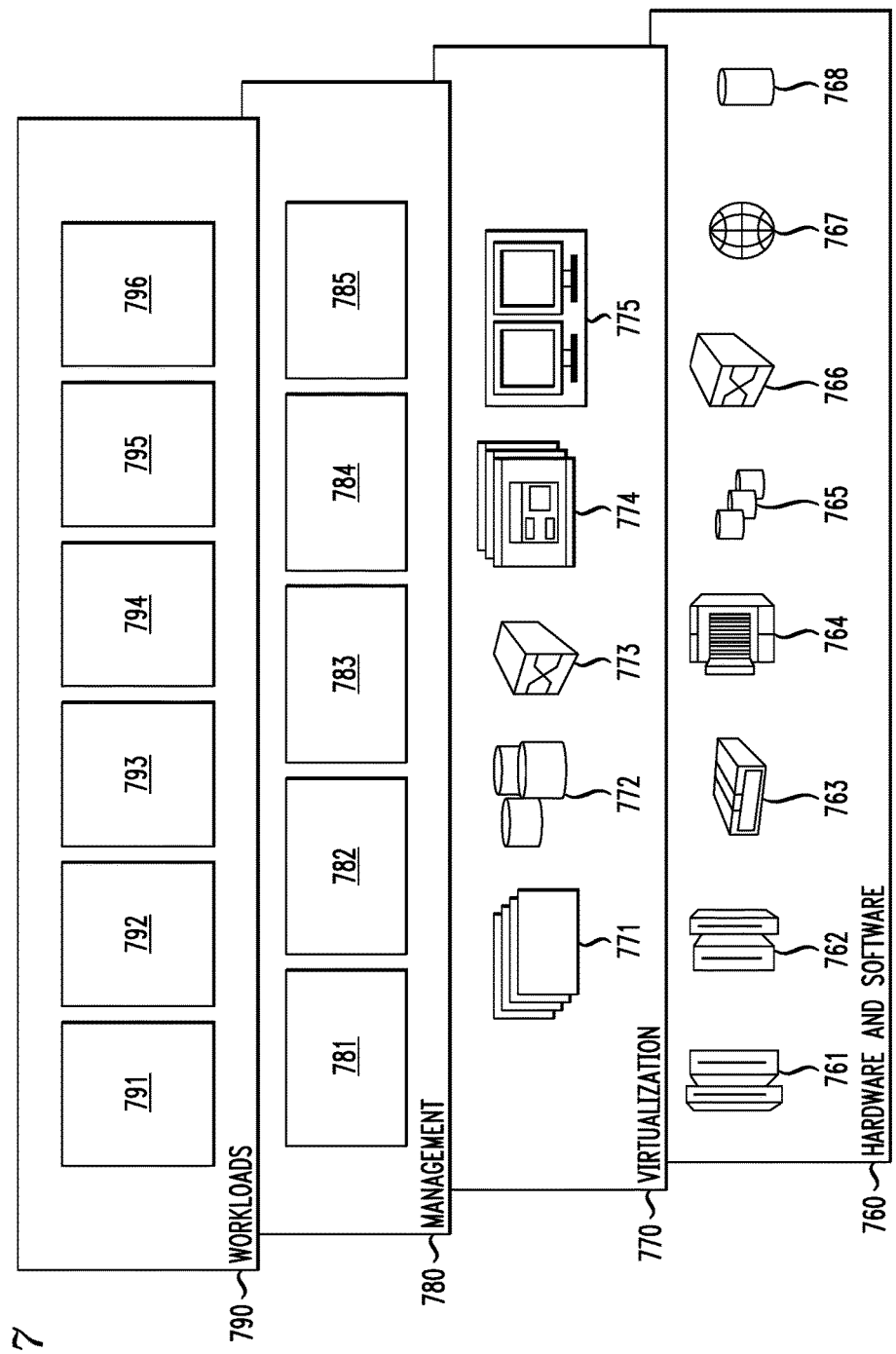
FIG. 7 depicts abstraction model layers, according to an embodiment of the present invention.

Referring now to FIG. 7, a set of functional abstraction layers provided by cloud computing environment 650 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 760 includes hardware and software components. Examples of hardware components include: mainframes 761; RISC (Reduced Instruction Set Computer) architecture based servers 762; servers 763; blade servers 764; storage devices 765; and networks and networking components 766. In some embodiments, software components include network application server software 767 and database software 768.

Virtualization layer 770 provides an abstraction layer from which the following examples of virtual entities may be provided: virtual servers 771; virtual storage 772; virtual networks 773, including virtual private networks; virtual applications and operating systems 774; and virtual clients 775.

In one example, management layer 780 may provide the functions described below. Resource provisioning 781 provides dynamic procurement of computing resources and other resources that are utilized to perform tasks within the cloud computing environment. Metering and Pricing 782 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 783 provides access to the cloud computing environment for consumers and system administrators. Service level management 784 provides cloud computing resource allocation and management such that required service levels are met. Service Level Agreement (SLA) planning and fulfillment 785 provide pre-arrangement for, and procurement of, cloud computing resources for which a future requirement is anticipated in accordance with an SLA.

Workloads layer 790 provides examples of functionality for which the cloud computing environment may be utilized. Examples of workloads and functions which may be provided from this layer include: mapping and navigation 791; software development and lifecycle management 792; virtual classroom education delivery 793; data analytics processing 794; transaction processing 795; and personalized routing and incentives processing 796, which may perform one or more of the functions described above.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method comprising:
   registering a given client device with a server to receive personalized routing for a given user, the given client device comprising a mobile computing device;
   building a user model for the given user, the user model being based on personal attributes for a plurality of users including the given user;
   identifying patterns of personal attributes for the given user;
   generating a personalized route for the given user based on matching the patterns of personal attributes with one or more route attributes;
   identifying one or more personalized incentives for the given user based on the personal attributes of the given user and the route attributes;
   modifying the personalized route for the given user to generate an incentivized personalized route for the given user that utilizes at least one of the identified personalized incentives;
   transmitting a notification from the server to the given client device over one or more wireless networks, wherein the notification causes the given client device to display the incentivized personalized route for the given user and to provide one or more selectable user interface features configured to display information regarding how the one or more personalized incentives affect the personalized route, the displayed information regarding how the one or more personalized incentives affect the personalized route comprising an indication of at least one of a time and a distance added to the personalized route by the one or more personalized incentives; and
   receiving, at the server from the given client device, feedback regarding the one or more personalized incentives in the incentivized personalized route;
   wherein identifying the patterns of personal attributes for the given user further comprises identifying one or more other users associated with the given user; and
   wherein identifying the one or more personalized incentives for the given user comprises determining one or more incentives associated with one or more locations that at least one of intersect and are within threshold distances of both the personalized route of the given user and at least one additional personalized route for at least one of the other users;
   wherein modifying the personalized route for the given user comprises modifying both the personalized route for the given user and the at least one additional personalized route for the at least one other user to utilize at least one of the incentives associated with at least one location that at least one of intersects and is within threshold distances of both the personalized route for the given user and the at least one additional personalized route for the at least one other user.

2. The method of claim 1, wherein building the user model is based on mining one or more social networks of the given user.

3. The method of claim 2, wherein building the user model comprises creating a graph network of actions of the given user and other ones of the plurality of users based on data obtained from mining the one or more social networks of the given user.

4. The method of claim 3, wherein identifying the patterns of personal attributes comprises traversing the graph network using one or more graph algorithms.

5. The method of claim 2, wherein identifying one or more personalized incentives for the given user comprises:
   mapping social media activity of the given user and one or more other users associated with the given user to determine a set of preferred products, places and locations;
   determining, from a database of incentives, one or more personalized incentives linked to the set of preferred products, places and locations.

6. The method of claim 1, wherein the personal attributes comprise one or more preferred transportation modes, lifestyle factors and travel history.

7. The method of claim 1, wherein the route attributes comprise available transportation modes and points of interest locations.

8. The method of claim 1, further comprising:
   obtaining weather data for one or more locations between a source and destination of the personalized route;
   adjusting one or more of the route attributes based on the weather data;
   wherein adjusting one or more of the route attributes affects the one or more personalized incentives identified for the given user.

9. The method of claim 1, further comprising:
   obtaining live traffic data for one or more locations between a source and destination of the personalized route; and
   adjusting one or more of the route attributes based on the live traffic data;
   wherein adjusting one or more of the route attributes affects the one or more personalized incentives identified for the given user.

10. The method of claim 1, further comprising:
    registering one or more incentive sources with the server; and
    receiving, via at least one of the incentive sources, a plurality of incentives.

11. The method of claim 10, wherein said at least one of the incentive sources comprises a business entity.

12. The method of claim 10, wherein:
    the plurality of incentives are organized into a plurality of incentive levels; and
    identifying the one or more personalized incentives for the given user comprises determining a given incentive level for the given user and selecting one or more incentives from the given incentive level as the one or more personalized incentives for the given user.

13. The method of claim 12, wherein the given incentive level for the given user is determined based on rewards earned by the given user for past activity.

14. The method of claim 13, wherein the rewards are earned at least in part by utilizing incentivized personalized routes provided by the server.

15. The method of claim 1, wherein identifying the one or more personalized incentives for the given user is based at least in part on one or more contextual parameters, the one or more contextual parameters comprising: a time of day, a destination of the personalized route and travel purpose.

16. The method of claim 1, wherein identifying patterns of personal attributes for the given user comprises utilizing cognitive learning algorithms.

17. A computer program product comprising a non-transitory computer readable storage medium for storing computer readable program code which, when executed, causes a computer:
to register a given client device to receive personalized routing for a given user, the given client device comprising a mobile computing device;
to build a user model for the given user, the user model being based on personal attributes for a plurality of users including the given user;
to identify patterns of personal attributes for the given user;
to generate a personalized route for the given user based on matching the patterns of personal attributes with one or more route attributes;
to identify one or more personalized incentives for the given user based on the personal attributes of the given user and the route attributes;
to modify the personalized route for the given user to generate an incentivized personalized route for the given user that utilizes at least one of the identified personalized incentives;
to transmit a notification to the given client device over one or more wireless networks, wherein the notification causes the given client device to display the incentivized personalized route for the given user and to provide one or more selectable user interface features configured to display information regarding how the one or more personalized incentives affect the personalized route, the displayed information regarding how the one or more personalized incentives affect the personalized route comprising an indication of at least one of a time and a distance added to the personalized route by the one or more personalized incentives; and
to receive, from the given client device, feedback regarding the one or more personalized incentives in the incentivized personalized route;
wherein identifying the patterns of personal attributes for the given user further comprises identifying one or more other users associated with the given user; and
wherein identifying the one or more personalized incentives for the given user comprises determining one or more incentives associated with one or more locations that at least one of intersect and are within threshold distances of both the personalized route of the given user and at least one additional personalized route for at least one of the other users;
wherein modifying the personalized route for the given user comprises modifying both the personalized route for the given user and the at least one additional personalized route for the at least one other user to utilize at least one of the incentives associated with at least one location that at least one of intersects and is within threshold distances of both the personalized route for the given user and the at least one additional personalized route for the at least one other user.

18. An apparatus comprising:
a processing device comprising a processor coupled to a memory;
the processing device being configured:
to register a given client device to receive personalized routing for a given user, the given client device comprising a mobile computing device;
to build a user model for the given user, the user model being based on personal attributes for a plurality of users including the given user;
to identify patterns of personal attributes for the given user;
to generate a personalized route for the given user based on matching the patterns of personal attributes with one or more route attributes;
to identify one or more personalized incentives for the given user based on the personal attributes of the given user and the route attributes;
to modify the personalized route for the given user to generate an incentivized personalized route for the given user that utilizes at least one of the identified personalized incentives;
to transmit a notification to the given client device over one or more wireless networks, wherein the notification causes the given client device to display the incentivized personalized route for the given user and to provide one or more selectable user interface features configured to display information regarding how the one or more personalized incentives affect the personalized route, the displayed information regarding how the one or more personalized incentives affect the personalized route comprising an indication of at least one of a time and a distance added to the personalized route by the one or more personalized incentives; and
to receive, from the given client device, feedback regarding the one or more personalized incentives in the incentivized personalized route;
wherein identifying the patterns of personal attributes for the given user further comprises identifying one or more other users associated with the given user; and
wherein identifying the one or more personalized incentives for the given user comprises determining one or more incentives associated with one or more locations that at least one of intersect and are within threshold distances of both the personalized route of the given user and at least one additional personalized route for at least one of the other users;
wherein modifying the personalized route for the given user comprises modifying both the personalized route for the given user and the at least one additional personalized route for the at least one other user to utilize at least one of the incentives associated with at least one location that at least one of intersects and is within threshold distances of both the personalized route for the given user and the at least one additional personalized route for the at least one other user.

19. The apparatus of claim 18, wherein the processing device implements a cloud-based server.

20. The method of claim 1, further comprising utilizing the feedback to identify one or more additional personalized incentives for the given user, the one or more additional personalized incentives being utilized in generating at least one additional incentivized personalized route for the given user.

* * * * *